United States Patent
Ireland

(10) Patent No.: US 10,999,979 B2
(45) Date of Patent: May 11, 2021

(54) AGRICULTURAL STAKE TO SUPPORT PLANTS AND ASSOCIATED METHODS

(71) Applicant: FLORIDA AGRICULTURAL STAKES, LLC, Oakland, FL (US)

(72) Inventor: Kenneth D. Ireland, Oakland, FL (US)

(73) Assignee: FLORIDA AGRICULTURAL STAKES, LLC, Oakland, FL (US)

( * ) Notice: Subject to any disclaimer, the term of this patent is extended or adjusted under 35 U.S.C. 154(b) by 0 days.

(21) Appl. No.: 16/514,257

(22) Filed: Jul. 17, 2019

(65) Prior Publication Data

US 2020/0022317 A1    Jan. 23, 2020

Related U.S. Application Data

(60) Provisional application No. 62/699,248, filed on Jul. 17, 2018.

(51) Int. Cl.

| | |
|---|---|
| *A01G 9/12* | (2006.01) |
| *B29D 99/00* | (2010.01) |
| *B29L 31/00* | (2006.01) |
| *B29C 48/06* | (2019.01) |
| *B29K 309/08* | (2006.01) |

(52) U.S. Cl.
CPC ......... *A01G 9/122* (2013.01); *B29D 99/0003* (2013.01); *B29C 48/06* (2019.02); *B29K 2309/08* (2013.01); *B29L 2031/7004* (2013.01)

(58) Field of Classification Search
CPC .......... A01G 9/122; A01G 9/12; A01G 9/128; A01G 17/04; A01G 9/124; A01G 17/10; A01G 13/0237; A01G 13/0268; A01G 13/02; A01G 13/0281; A01G 13/0275; A01G 9/1438; A01G 13/0231; A01G 13/0293; A01G 17/06; A01G 13/0262; A01G 13/04; A01G 17/02; A01G 13/00; A01G 13/025; A01G 13/0287; Y02A 40/284; Y02A 40/264; E04H 15/62; E02D 5/80; E02D 5/803
USPC ....................................................... 47/47, 44
See application file for complete search history.

(56) References Cited

U.S. PATENT DOCUMENTS

| | | | |
|---|---|---|---|
| 3,676,208 A * | 7/1972 | Griffin ................. | C09D 163/00 428/149 |
| 3,875,699 A | 4/1975 | Lamarre | |
| 4,016,084 A * | 4/1977 | Primo ..................... | C05F 11/00 252/602 |

(Continued)

OTHER PUBLICATIONS

Fiberglass Stakes, Fiberglass Stakes Suppliers and Manufacturers at alibaba.com; Website; 1999-2018 Alibaba.com; 7 pages; available at https://www.alibaba.com/showroom/fiberglass-stakes_1.html.

*Primary Examiner* — Peter M Poon
*Assistant Examiner* — Jeffrey R Larsen
(74) *Attorney, Agent, or Firm* — Matthew G. McKinney, Esq.; Allen Dyer et al.

(57) ABSTRACT

An agricultural stake to support plant includes a fiberglass reinforced plastic (FRP) elongated member comprising a top end and a bottom end, and an exterior coating impregnated with an aggregate covering an exterior surface of the elongated member. The exterior coating is configured to provide purchase to a line attached to the elongated member. A cap may be secured over the top end of the elongated member and is configured to withstand a force used to drive the elongated member into a ground surface.

19 Claims, 4 Drawing Sheets

(56) References Cited

U.S. PATENT DOCUMENTS

| | | | |
|---|---|---|---|
| 4,373,833 A | 2/1983 | Watanabe | |
| 5,279,073 A | 1/1994 | Czebieniak | |
| 5,965,257 A * | 10/1999 | Ahluwalia | C03C 17/007 |
| | | | 428/357 |
| 2003/0159347 A1 * | 8/2003 | Malofsky | A01G 9/12 |
| | | | 47/47 |
| 2004/0099300 A1 * | 5/2004 | Warren | E04H 15/62 |
| | | | 135/118 |
| 2007/0266627 A1 * | 11/2007 | Shelton | A01G 9/12 |
| | | | 47/45 |
| 2014/0259901 A1 * | 9/2014 | Williams | A01G 13/10 |
| | | | 47/31 |
| 2016/0286735 A1 * | 10/2016 | Parrish | A01G 9/126 |
| 2018/0282549 A1 * | 10/2018 | Foster-Bey, Jr. | C04B 7/02 |

\* cited by examiner

AGRICULTURAL STAKE TO SUPPORT PLANTS AND ASSOCIATED METHODS

CROSS-REFERENCE TO RELATED APPLICATIONS

This application claims priority to U.S. Provisional Application Ser. No. 62/699,248 filed on Jul. 17, 2018, the contents of which are herein incorporated by reference in their entirety.

TECHNICAL FIELD

The present invention relates to the field of agriculture, and, more particularly, to an agricultural stake to support plants and associated methods.

BACKGROUND

Stakes are generally formed of wood for the physical support of plants. The availability of wood for the stakes has been reduced over the years as demand for wood has increased. In addition, wooden stakes have a limited life span in the field requiring the constant replacement as the wood stakes degrade over time.

Metal stakes have been introduced as a replacement to the wood stakes. However, the cost of metal stakes is high and the metal stakes rust over time and must also be replaced periodically.

Accordingly, what is needed in the art is an agricultural stake that is cost effective, does not require periodic replacement, and can be easily implemented in the field with existing stake driving equipment.

SUMMARY

In view of the foregoing background, it is therefore an object of the present invention to provide an improved agricultural stake. The agricultural stake includes a fiberglass reinforced plastic (FRP) elongated member comprising a top end and a bottom end, and may include a cap secured over the top end of the elongated member that is configured to withstand a force used to drive the elongated member into a ground surface. The agricultural stake also includes an exterior coating impregnated with an aggregate and covering an exterior surface of the elongated member. The exterior coating is configured to provide purchase to a line attached to the elongated member.

The elongated member may have one of an ellipse cross section, an oval cross section, a rectangular cross section, an octagonal cross section, and a polygon cross section.

In another aspect, a method of making an agricultural stake to support plants is disclosed. The method includes extruding an elongated member comprised of fiberglass reinforced plastic, and applying a coating impregnated with an aggregate to an exterior of the elongated member. The method may also include securing a cap to a top end of the elongated member.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
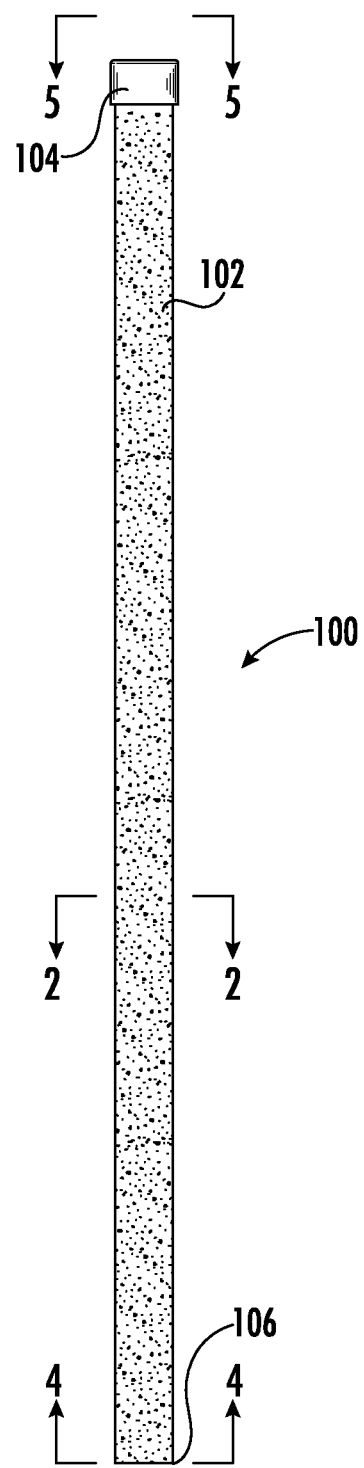
FIG. 1 is an elevational view of an agricultural stake in accordance with a particular embodiment of the invention.

Referring now to FIG. 1, a stake 100 is shown that is used to support plants in the field. The stake 100 is relatively lightweight but strong enough to have wire, line, string, or similar material strung between successive stakes 100 in the field. Accordingly, the stake 100 may be advantageously formed of extruded fiberglass reinforced plastic (FRP) material, for example. The stake 100 comprises little to no flex memory but does allow some flex in order to bend during bad weather and high winds while under a full production weight load without breaking.

The stake 100 includes an elongated member 102 that is generally a thin walled tube. The elongated member 102 is generally consistent over the length so that it may be readily extruded. This minimizes the cost of items formed in accordance with this invention. The stake 100 may have an outside diameter of ¾ inches with a wall thickness 110 of approximately 4 mm. Those of ordinary skill in the art can appreciate that other dimensions and relative dimensions of the elongated member 102 may be employed.

In particular, the diameter of the stake 100 is selected to handle various weight loads through the growth of a plant up to fill maturity. For example, a pattern of seventy-five inch long stakes 100 dispersed within a field may withstand a 75,000-80,000 pound weight load per acre. The length of the stakes 100 may vary between forty to seventy-five inches, for example, depending on the plants to support. An individual stake 100 may withstand to over fifty-five plus pounds, which equates to over 190,000 pounds per acre.

Figure 2:
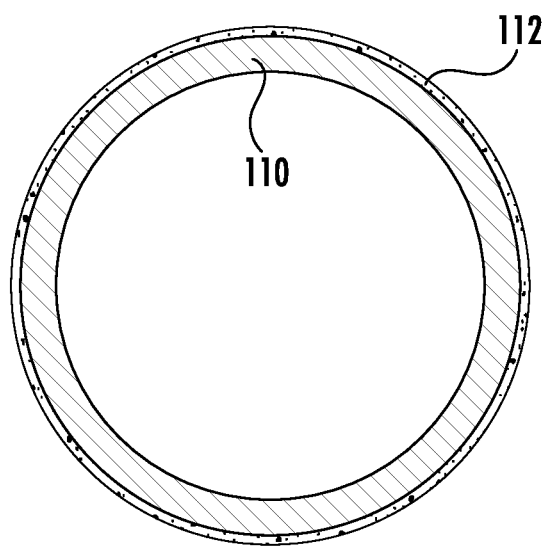
FIG. 2 is a cross sectional view taken in the direction of line 2-2 of FIG. 1.

The exterior surface of the elongated member as shown in FIG. 2, comprises a textured exterior coating 112 impregnated with an aggregate. The aggregate may be fine sand, quartz, or other hard material that provides an exterior surface that provides purchase for a line attached thereto. The aggregate may be 60 to 80 grit size, for example, and the textured coating 112 is sprayed onto an exterior surface of the elongated member 102 of the stake 100. As explained above, the stakes 100 may be installed in a field in rows with a line extending laterally between stakes 100 that is used to support growing plants, such as tomatoes. The textured exterior coating 112 is important so that the line does not slip down the stake 100 in the field.

The stake 100 may also include a fire-retardant additive that allows the stake 100 to withstand the commercial burning process after harvesting. Torch heat can be excessive and the stake 100 is configured to handle the extreme temperature without melting or loss of memory. Further, the stake 100 may have an ultraviolet (UV) protection additive that contributes to the relatively long field life of twelve to fifteen years.

Figure 3:
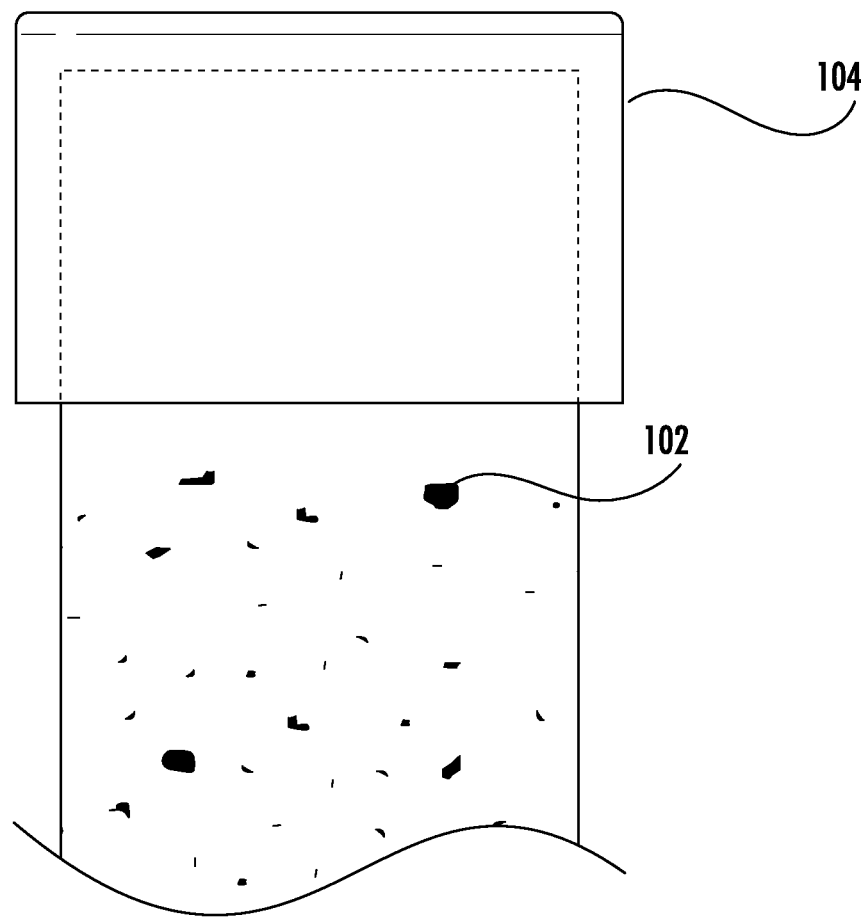
FIG. 3 is a detailed elevational view of a top end of the agricultural stake of FIG. 1.
Figure 4:
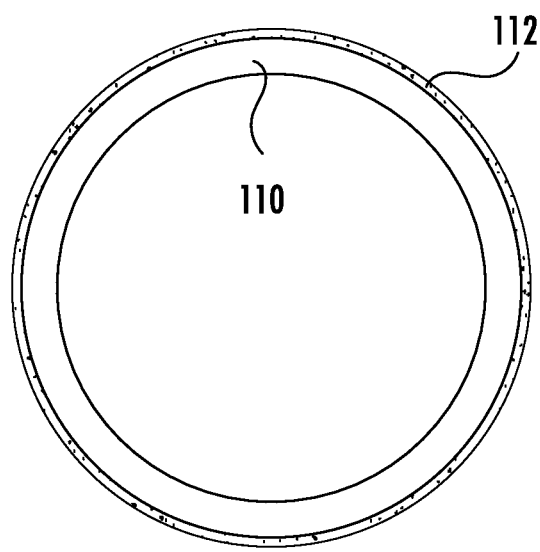
FIG. 4 is a bottom view of the agricultural stake taken in the direction of line 4-4 of FIG. 1.
Figure 5:
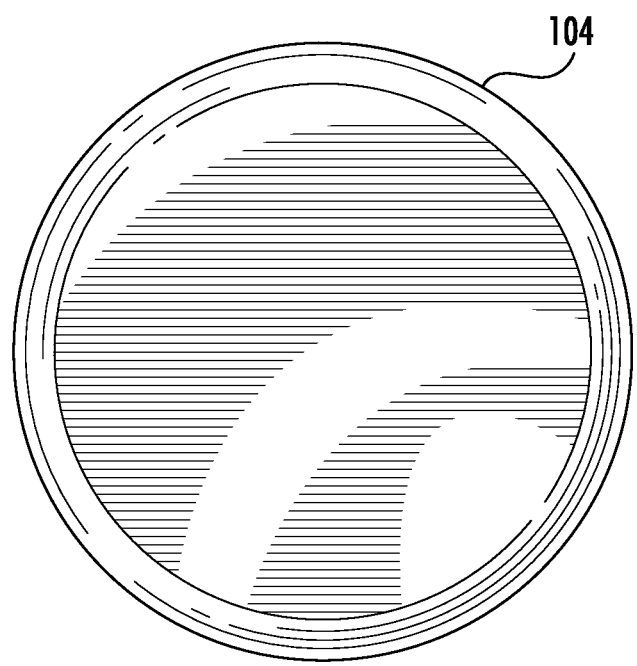
FIG. 5 is a top view of the agricultural stake taken in the direction of line 5-5 of FIG. 1.

In addition, a cap 104 may be secured over a top end of the stake 100 as shown best in FIG. 3. A top view of the cap 104 is shown in FIG. 5 having a circular shape in this particular aspect. Accordingly, a bottom end 106 of the stake 100 as shown in FIG. 4 is configured to be driven into the ground using mechanical means without damaging the structural integrity of the stake 100 itself. The cap 104 may be comprised of FRP or a different material than the elongated member 102. For example, the cap 104 may be comprised of a metal such as aluminum and secured to the top end of the elongated member 102 using an adhesive. The cap 104 may also be ASA plastic or other plastic.

Thus, the stakes 100 formed in accordance with the present invention may be driven into the ground and placed in spaced relation in a row of stakes 100. Wires or lines are then strung between the stakes 100 to support vines and conventional connectors may be employed for connecting them to the stakes 100. The stakes 100 are inexpensive and substantially impervious to sprays, fertilizers and atmospheric conditions.

Figure 6:
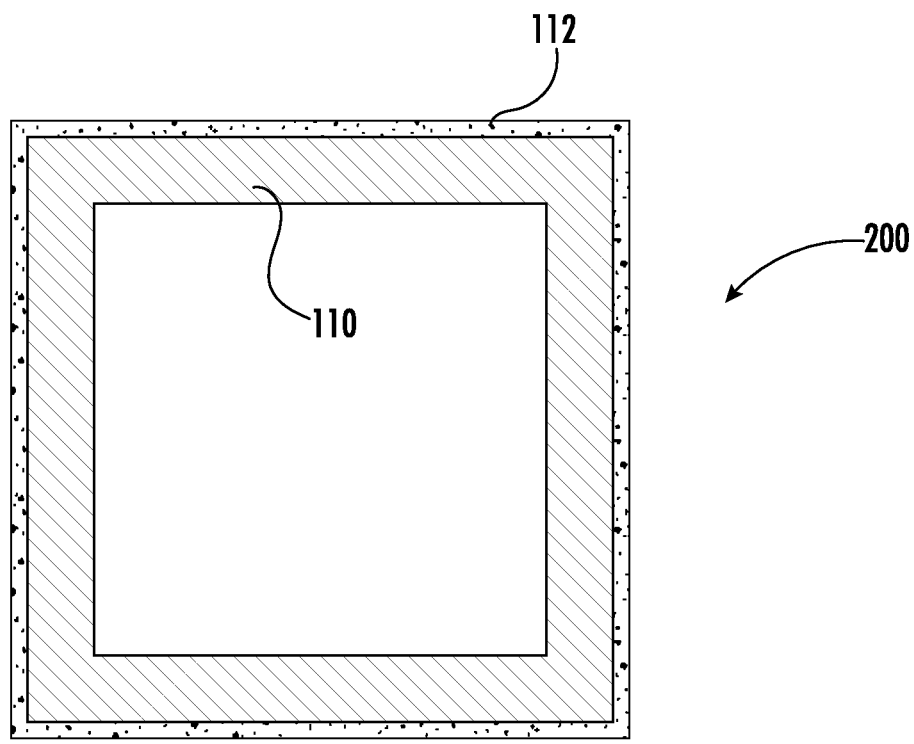
FIG. 6 is a cross sectional view of the agricultural stake of FIG. 1 in accordance with an alternative embodiment of the invention.
Figure 7:
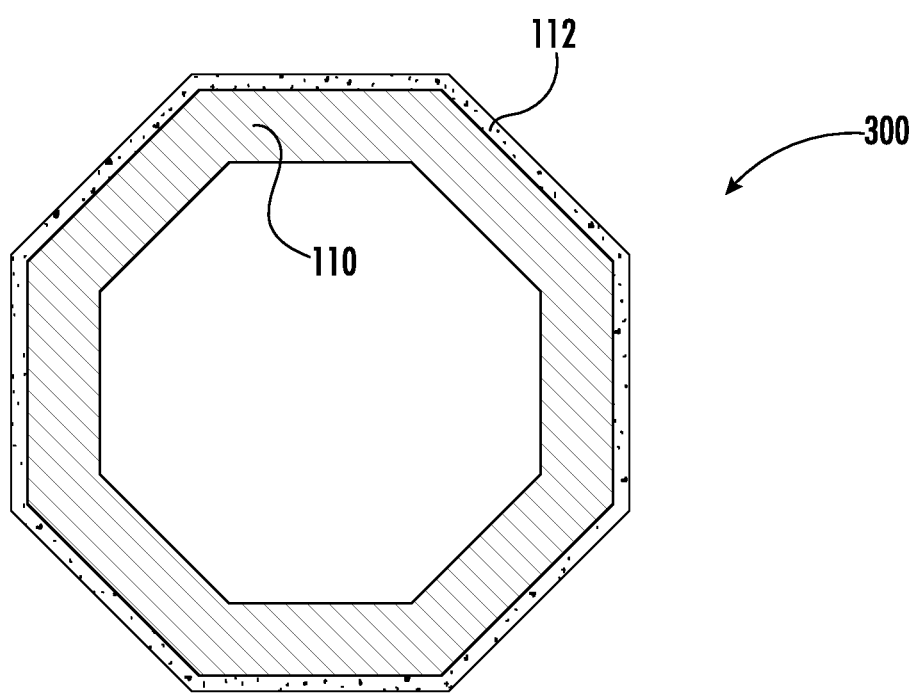
FIG. 7 is a cross sectional view of the agricultural stake of FIG. 1 in accordance with yet another alternative embodiment of the invention.

The cross-section shape of the stake 100 is not limited to a cylindrical or circular shape. Indeed, in other aspects the cross-sectional shape of a stake 200 can be rectangular, as shown in FIG. 6, a stake 300 may have an octagonal shape as shown in FIG. 7, or any other shape that can be extruded.

A method of making the agricultural stake 100 to support plants described above includes extruding an elongated member comprised of fiberglass reinforced plastic, and applying a coating impregnated with an aggregate to an exterior of the elongated member. The method may also include securing a cap to a top end of the elongated member.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An agricultural stake to support plants, the agricultural stake comprising:
   an elongated member comprising a thin walled tube having a top end and a bottom end, wherein the elongated member comprises fiberglass reinforced plastic having a length between 40 to 75 inches and the elongated member exhibiting no flex memory; and
   an exterior coating comprising a fire-retardant additive and an aggregate, the exterior coating completely covering an exterior surface of the elongated member to protect the elongated member from burning, the exterior coating comprising a material different than the fiberglass reinforced plastic of the elongated member;
   wherein the aggregate comprises sand being angular in shape and having between 60 to 80 grit size randomly dispersed within the exterior coating to provide a randomized textured surface pattern of the aggregate within the exterior coating on the elongated member.

2. The agricultural stake of claim 1, further comprising a cap secured over the top end of the elongated member and configured to withstand a force used to drive the elongated member into a ground surface.

3. The agricultural stake of claim 1, wherein the elongated member comprises an ellipse cross section.

4. The agricultural stake of claim 1, wherein the elongated member comprises an oval cross section.

5. The agricultural stake of claim 1, wherein the elongated member comprises a rectangular cross section.

6. The agricultural stake of claim 1, wherein the elongated member comprises an octagonal cross section.

7. The agricultural stake of claim 1, wherein the elongated member comprises a polygon cross section.

8. The agricultural stake of claim 1, wherein the exterior coating comprises an ultraviolet (UV) protection additive.

9. The agricultural stake of claim 2, wherein the cap comprises metal or plastic.

10. The agricultural stake of claim 1, wherein the stake comprises a tube having an outside diameter of ¾ inches.

11. The agricultural stake of claim 10, wherein the tube comprises a thickness of approximately 4 millimeters.

12. The agricultural stake of claim 2, wherein the cap comprises aluminum and is secured to the top end of the elongated member using an adhesive.

13. The agricultural stake of claim 1, wherein a diameter of the elongated member is consistent and the elongated member comprises an extruded material.

14. An agricultural system to support plants, the agricultural system comprising: at least one stake comprising an elongated member comprising a thin walled tube having a top end and a bottom end, wherein the elongated member comprises fiberglass reinforced plastic having a length between 40 to 75 inches and the elongated member exhibiting no flex memory; and
   an exterior coating impregnated with an aggregate and completely covering an exterior surface of the elongated member, wherein the exterior coating comprises a fire retardant additive to protect the elongated member from burning, the exterior coating comprising a material different than the fiberglass reinforced plastic of the elongated member;
   wherein the aggregate comprising sand and being angular in shape and having between 60 to 80 grit size randomly dispersed within the exterior coating to provide a randomized textured surface pattern of the aggregate within the exterior coating on the elongated member.

15. The agricultural system of claim 14, wherein the elongated member comprises either an ellipse cross section, an oval cross section, a rectangular cross section, an octagonal cross section, or a polygon cross section.

16. The agricultural system of claim 14, wherein the exterior coating comprises an ultraviolet (UV) protection additive.

17. A method of making an agricultural stake to support plants, the method comprising:
   extruding an elongated member comprised of fiberglass reinforced plastic to form a thin walled tube having a top end and a bottom end and having a length between 40 to 75 inches and exhibiting no flex memory; and
   applying a coating comprising a fire-retardant additive and an aggregate to an exterior surface of the elongated member, the coating completely covering the exterior surface of the elongated member to protect the elongated member from burning, the coating comprising a material different than the fiberglass reinforced plastic of the elongated member;
   wherein the aggregate comprises sand being angular in shape having between 60 to 80 grit size randomly dispersed within the coating to provide a randomized textured surface pattern of the aggregate within the coating on the elongated member.

18. The method of claim 17, further comprising securing a cap to said top end of the elongated member.

19. The method of claim 18, wherein the elongated member is extruded to form either an ellipse cross section, an oval cross section, a rectangular cross section, an octagonal cross section, or a polygon cross section.

* * * * *